(12) United States Patent
Suzuki et al.

(10) Patent No.: US 12,132,359 B2
(45) Date of Patent: Oct. 29, 2024

(54) ELECTRIC ACTUATOR

(71) Applicant: Nidec Tosok Corporation, Zama (JP)

(72) Inventors: Takamitsu Suzuki, Zama (JP); Kei Sato, Zama (JP); Masaya Furushou, Zama (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 254 days.

(21) Appl. No.: 17/892,210

(22) Filed: Aug. 22, 2022

(65) Prior Publication Data

US 2023/0055495 A1   Feb. 23, 2023

(30) Foreign Application Priority Data

Aug. 20, 2021 (JP) .................................. 2021-134810

(51) Int. Cl.
| | |
|---|---|
| *H02K 11/21* | (2016.01) |
| *H01H 3/26* | (2006.01) |
| *H02K 7/00* | (2006.01) |
| *H02K 7/14* | (2006.01) |
| *H02K 11/30* | (2016.01) |

(52) U.S. Cl.
CPC ............. *H02K 11/30* (2016.01); *H01H 3/26* (2013.01); *H02K 7/003* (2013.01); *H02K 7/14* (2013.01); *H02K 11/21* (2016.01)

(58) Field of Classification Search
CPC .......... H02K 11/21; H02K 3/26; H02K 7/003; H02K 7/14; F16H 61/12; F16H 2061/1284
See application file for complete search history.

(56) References Cited

U.S. PATENT DOCUMENTS

| | | | |
|---|---|---|---|
| 9,325,275 B2* | 4/2016 | Yamada ................ | H02P 29/027 |
| 2014/0025266 A1 | 1/2014 | Yamada | |
| 2015/0160639 A1* | 6/2015 | Yoshida ................ | H02P 29/032 |
| | | | 318/635 |
| 2017/0299054 A1* | 10/2017 | Kurita .................... | F16H 61/32 |

* cited by examiner

*Primary Examiner* — Edwin A Young
(74) *Attorney, Agent, or Firm* — Keating & Bennett, LLP

(57) ABSTRACT

An electric actuator includes a motor, an output shaft, a detent plate, an elastic portion including a contacted portion, a first rotation sensor, a second rotation sensor, and a controller. In a case where an abnormality has occurred in the second rotation sensor, the controller executes causing the motor to rotate to cause the contacted portion to abut a first side wall portion located on one end side in the circumferential direction of a first valley portion in the detent plate, acquiring the first rotation angle when the contacted portion abuts on the first side wall portion, reversely rotating the motor to an angle, and determining that the contacted portion is stationary at the parking position.

8 Claims, 7 Drawing Sheets

ELECTRIC ACTUATOR

CROSS-REFERENCE TO RELATED APPLICATIONS

The present application claims priority under 35 U.S.C. § 119 to Japanese Patent Application No. 2021-134810, filed on Aug. 20, 2021, the entire contents of which are hereby incorporated herein by reference.

FIELD OF THE INVENTION

The present disclosure relates to an electric actuator.

BACKGROUND

For example, conventionally, a range switching device that switches a shift range using a motor as a drive source is known. A conventional range switching device includes: an encoder that outputs a pulse signal in synchronization with rotation of a motor; a control unit that controls a switching position of a range switching mechanism by driving the motor based on a count value (encoder count value) of the pulse signal; and a detent mechanism that holds the range switching mechanism at a position of each range by fitting an engaging portion into a range holding recess when the range switching mechanism is switched to the position of each range.

In the conventional range switching device, the driving force of the motor is released after the motor is rotated until the engaging portion abuts on the P range wall (the side wall of the P range holding recessed portion), and it is determined that the engaging portion is stationary at the position of the P range holding recessed portion (P range valley position) when the variation amount of the encoder count value becomes a predetermined value or less. In the conventional range switching device, an encoder count value obtained when it is determined that the engaging portion is stationary at the P range valley position is acquired (learned) as the encoder count value at the reference position.

In the technique of the conventional range switching device, the driving force of the motor is released after the motor is rotated until the engaging portion abuts on the P range wall. However, there may be a case where the engaging portion moves to a position greatly deviated from the P range valley position in a state where the driving force of the motor is released. Even in this case, when the variation amount of the encoder count value is equal to or less than the predetermined value, it is determined that the engaging portion is stationary at the P range valley position. Therefore, there is a possibility that the encoder count value obtained at a position greatly deviated from the P range valley position is erroneously learned as the encoder count value at the reference position.

SUMMARY

An electric actuator according to an example embodiment of the present disclosure is an electric actuator to switch a shift position, the electric actuator including a motor, an output shaft to be driven by the motor, a detent plate fixed to the output shaft and including valley portions including a first valley portion corresponding to a parking position provided on one end side in a circumferential direction and a second valley portion corresponding to a non-parking position provided on another end side in the circumferential direction, an elastic portion including a contacted portion to be brought into contact with any one of the valley portions by an elastic force generated by rotation of the detent plate, a first rotation sensor to detect a first rotation angle that is a rotation angle of the motor, a second rotation sensor to detect a second rotation angle that is a rotation angle of the output shaft, and a controller to control the motor based on detection results of the first rotation angle and the second rotation angle. The controller is configured or programmed to, when an abnormality occurs in the second rotation sensor, execute abutting of the contacted portion on a first side wall portion located on one end side in the circumferential direction of the first valley portion in the detent plate by rotating the motor, acquiring, as a side wall position angle, the first rotation angle detected by the first rotation sensor when the contacted portion abuts on the first side wall portion, a reverse rotation process of reversely rotating the motor to an angle at which the first rotation angle corresponds to a target rotation angle with reference to the side wall position angle, and a stationary determination process of determining that the contacted portion is stationary at the parking position when the first rotation angle detected by the first rotation sensor continues to fall within a first tolerance having the target rotation angle as a reference value within a first predetermined time.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described in detail below with reference to the drawings.

Figure 1:
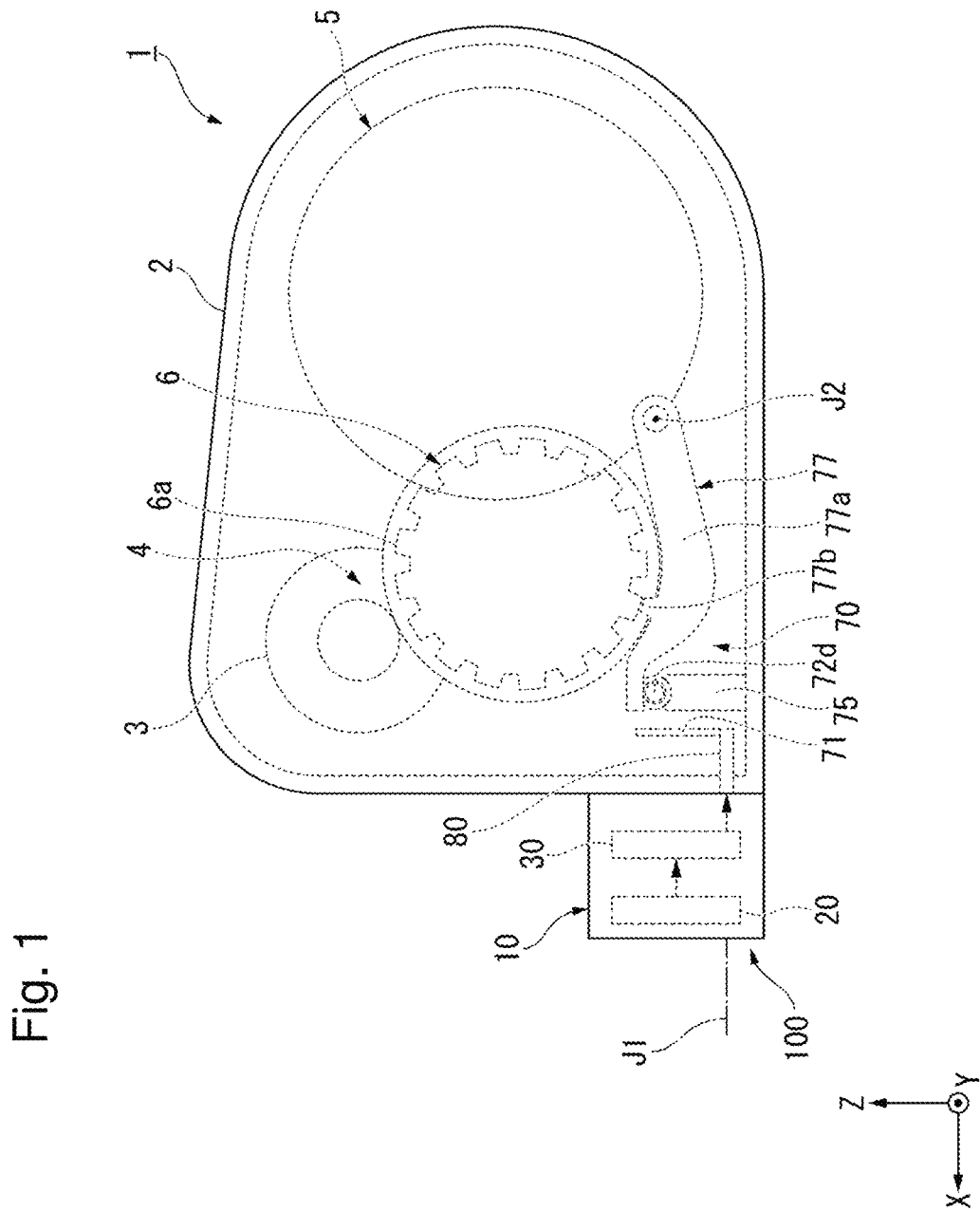
FIG. 1 is a view of a drive apparatus including an electric actuator according to an example embodiment of the present invention as viewed from one side in a lateral direction of a vehicle.
Figure 2:
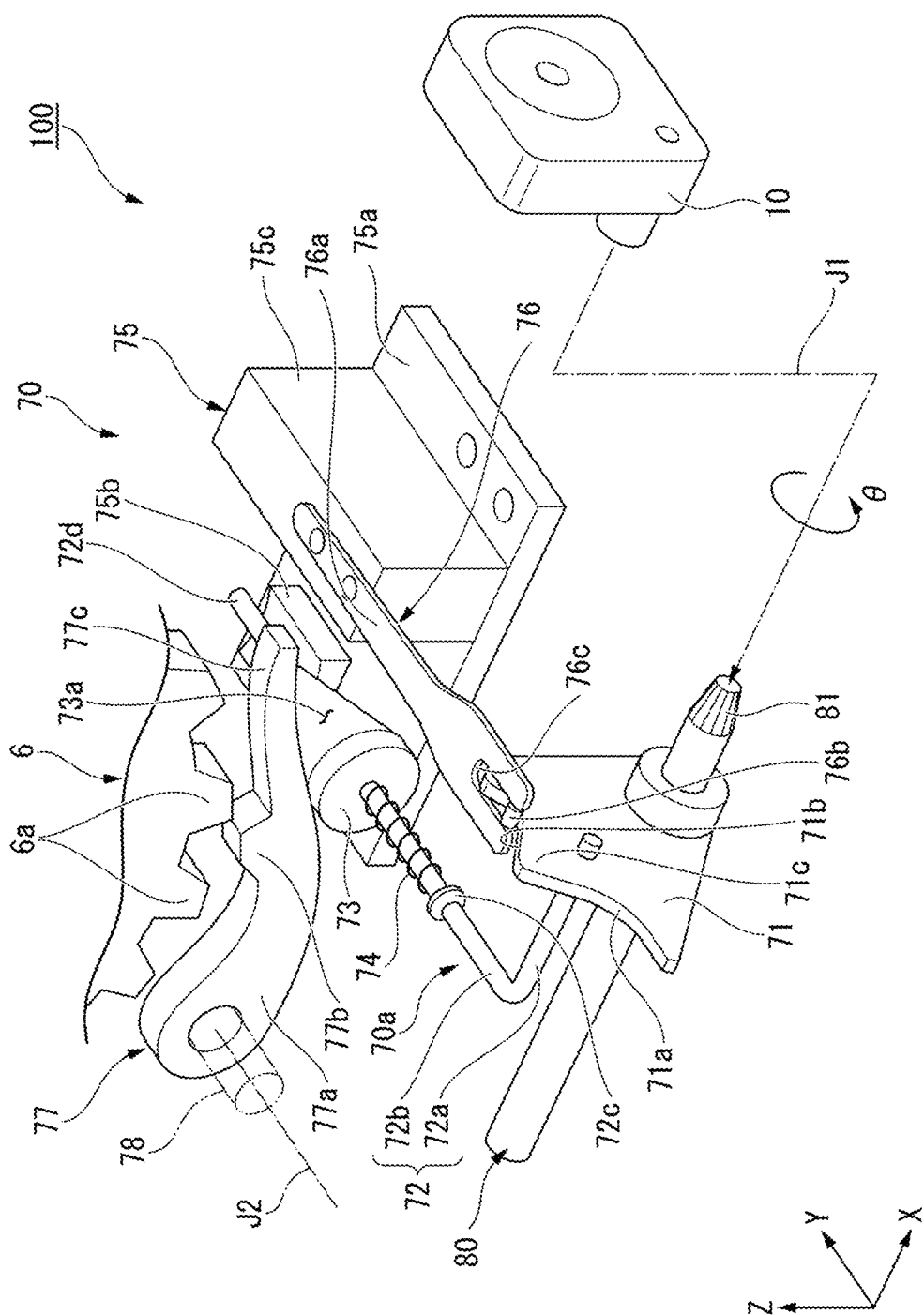
FIG. 2 is a perspective view illustrating an electric actuator according to an example embodiment of the present invention.

FIG. 1 is a view of a drive apparatus 1 including an electric actuator 100 according to the present example embodiment as viewed from one side in a lateral direction of a vehicle. FIG. 2 is a perspective view illustrating the electric actuator 100 of the present example embodiment. The drive apparatus 1 of the present example embodiment is mounted on an electric vehicle such as a hybrid electric vehicle (HEV), a plug-in hybrid electric vehicle (PHV), or an electric vehicle (EV), and is used as a driving source thereof. As illustrated in FIG. 1, the drive apparatus 1 includes a housing 2, a driving motor 3, a reduction gear 4, a differential device 5, a parking lock gear 6, and the electric actuator 100. As illustrated in FIGS. 1 and 2, the electric actuator 100 includes a motor unit 10, a parking switching mechanism 70, and an output shaft 80. The electric actuator 100 switches a shift position according to a shift operation of the vehicle.

In the following description, the vertical direction is defined and described on the basis of a positional relationship in a case where the drive apparatus 1 is mounted on a vehicle located on a horizontal road surface. In addition, in the drawings, an xyz coordinate system is shown appropriately as a three-dimensional orthogonal coordinate system. In the XYZ coordinate system, a Z-axis direction is a vertical direction in which a +Z side is an upper side and a −Z side is a lower side. An x-axis direction corresponds to a front-rear direction of the vehicle in which the drive apparatus 1 is installed, and is a direction perpendicular to the z-axis direction. In the present example embodiment, the +X side is one side in the front-rear direction of the vehicle, and the −X side is the other side in the front-rear direction of the vehicle. A Y-axis direction is a direction orthogonal to both the X-axis direction and the Z-axis direction, and is a lateral direction of the vehicle. In the present example embodiment, the +Y side is one side in the lateral direction of the vehicle, and the −Y side is the other side in the lateral direction of the vehicle.

In the present example embodiment, a direction parallel to the Z-axis direction is referred to as a "vertical direction Z", a direction parallel to the X-axis direction is referred to as a "front-rear direction X", and a direction parallel to the Y-axis direction is referred to as a "lateral direction Y". A positive side in the Z-axis direction (+Z side) is called "upper side", and a negative side in the Z-axis direction (−Z side) is called "lower side". A positive side (+X side) in the X-axis direction is referred to as "one side in the front-rear direction", and a negative side (−X side) in the X-axis direction is referred to as "the other side in the front-rear direction". A positive side (+Y side) in the Y-axis direction is referred to as "one side in the lateral direction", and a negative side (−Y side) in the Y-axis direction is referred to as "the other side in the lateral direction".

The output shaft 80 is connected to the motor unit 10 and rotated by the motor unit 10. In the present example embodiment, the output shaft 80 extends in the front-rear direction X around the central axis J1. In the following description, unless otherwise specified, the radial direction centered on the central axis J1 is simply referred to as "radial direction", and the circumferential direction centered on the central axis J1, that is, around the central axis J1 is simply referred to as "circumferential direction". As illustrated in FIG. 2, an end portion on one side (+X side) in the front-rear direction of the output shaft 80 is a connected portion 81 connected to the motor unit 10. The connected portion 81 is provided with a plurality of spline grooves extending in the front-rear direction X along the circumferential direction.

The housing 2 accommodates the driving motor 3, the reduction gear 4, the differential device 5, and the parking switching mechanism 70 therein. Although not illustrated, oil is contained in the housing 2. The reduction gear 4 is connected to the driving motor 3. The differential device 5 is connected to the reduction gear 4 and transmits torque output from the driving motor 3 to the axle of the vehicle. The parking lock gear 6 is fixed to a gear provided in the reduction gear 4. The parking lock gear 6 is connected to the axle of the vehicle via the reduction gear 4 and the differential device 5. The parking lock gear 6 has a plurality of tooth portions 6a.

The parking switching mechanism 70 is driven by the motor unit 10 based on a shift operation of the vehicle. The parking switching mechanism 70 switches the parking lock gear 6 between the locked state and the unlocked state. The parking switching mechanism 70 brings the parking lock gear 6 into the locked state when the shift position of the vehicle is the parking position (P range), and brings the parking lock gear 6 into the unlocked state when the shift position of the vehicle is a non-parking position other than the parking position. The case where the shift position of the vehicle is the non-parking position includes, for example, a case where the shift position of the vehicle is a drive position (D range), a neutral position (N range), a reverse position (R range), or the like. As illustrated in FIG. 2, the parking switching mechanism 70 includes a movable portion 70a, a parking lock arm 77, a support member 75, and a leaf spring 76.

The movable portion 70a moves along the lateral direction Y based on a shift operation of the vehicle. That is, in the present example embodiment, the lateral direction Y corresponds to a moving direction in which the movable portion 70a moves. The vertical direction Z corresponds to an intersecting direction intersecting with the moving direction in which the movable portion 70a moves, and the lower side corresponds to one side of the intersecting direction. In the present example embodiment, the movable portion 70a is moved by the motor unit 10 via the output shaft 80. The position of the movable portion 70a in the lateral direction Y is switched at least between the non-parking position and the parking position. That is, the movable portion 70a is moved between the parking position and the non-parking position by the output shaft 80. The non-parking position is a position in the lateral direction Y of the movable portion 70a when the shift position of the vehicle is other than the parking position. The parking position is a position in the lateral direction Y of the movable portion 70a when the shift position of the vehicle is the parking position. The parking position is a position on one side (+Y side) in the lateral direction with respect to the non-parking position. FIG. 2 illustrates a case where the movable portion 70a is located at the non-parking position.

The movable portion 70a includes a detent plate 71, a rod 72, a conical member 73, and a coil spring 74. The detent plate 71 is fixed to the output shaft 80. The detent plate 71 is rotated by the output shaft 80. The detent plate 71 extends radially outward from the output shaft 80. In the present example embodiment, the detent plate 71 extends upward from the output shaft 80. In the present example embodiment, the detent plate 71 has a plate shape whose plate surface faces the front-rear direction X. The width of the detent plate 71 increases as it goes away radially outward from the output shaft 80. The detent plate 71 has a plurality of valley portions including a first valley portion 71a provided on one end side in the circumferential direction of the detent plate 71 and corresponding to a parking position and a second valley portion 71b provided on the other end side in the circumferential direction of the detent plate 71 and corresponding to a non-parking position. Although FIG. 2 illustrates a case where the detent plate 71 has only one second valley portion 71*b* as the second valley portion corresponding to the non-parking position, a plurality of second valley portions may be provided in the detent plate 71.

The first valley portion 71*a* and the second valley portion 71*b* are provided at the radially outer end of the detent plate 71. The first valley portion 71*a* and the second valley portion 71*b* are recessed downward from the upper end portion of the detent plate 71. The first valley portion 71*a* and the second valley portion 71*b* penetrate the detent plate 71 in the front-rear direction X. The first valley portion 71*a* and the second valley portion 71*b* are arranged side by side along the circumferential direction. In the present example embodiment, the first valley portion 71*a* and the second valley portion 71*b* are arranged side by side in the lateral direction Y. The first valley portion 71*a* is located on the other side (−Y side) in the lateral direction of the second valley portion 71*b*. Since the first valley portion 71*a* and the second valley portion 71*b* are provided in the detent plate 71, a crest portion 71*c* protruding radially outward is provided in a portion of the detent plate 71 between the first valley portion 71*a* and the second valley portion 71*b* in the circumferential direction.

The rod 72 is arranged to be movable along the lateral direction Y. The rod 72 includes a connecting portion 72*a* and a rod body 72*b*. The connecting portion 72*a* has a rod shape extending in the front-rear direction X. An end portion on one side (+X side) in the front-rear direction of the connecting portion 72*a* penetrates the detent plate 71 in the front-rear direction X and is fixed to the detent plate 71. As a result, the rod 72 is connected to the output shaft 80 via the detent plate 71. The rod body 72*b* has a rod shape extending in the lateral direction Y. In the present example embodiment, the rod body 72*b* extends to one side (+Y side) in the lateral direction from the end portion on the other side (−X side) in the front-rear direction of the connecting portion 72*a*. The rod body 72*b* has a protrusion 72*c* at a portion near the connecting portion 72*a*. A cylindrical member 72*d* extending in the lateral direction Y is fitted and fixed to an end portion on one side in the lateral direction of the rod body 72*b*.

The conical member 73 has a conical shape through which the rod body 72*b* passes. The conical member 73 extends in the lateral direction Y. A portion on one side (+Y side) in the lateral direction of the outer peripheral surface of the conical member 73 is a tapered surface 73*a* whose outer diameter decreases toward the one side in the lateral direction. The conical member 73 is movable in the lateral direction Y with respect to the rod body 72*b*.

The coil spring 74 extends in the lateral direction Y. The coil spring 74 is disposed between the conical member 73 and the protrusion 72*c* in the lateral direction Y. The rod body 72*b* passes through the coil spring 74. The end portion on the other side (−Y side) in the lateral direction of the coil spring 74 is in contact with the protrusion 72*c*. The end portion on one side (+Y side) in the lateral direction of the coil spring 74 is in contact with the surface on the other side in the lateral direction of the conical member 73. The coil spring 74 expands and contracts by the conical member 73 relatively moving in the lateral direction Y with respect to the rod body 72*b*, and applies an elastic force in the lateral direction Y to the conical member 73.

The parking lock arm 77 is located on the other side (−X side) in the front-rear direction of the movable portion 70*a*. The parking lock arm 77 is rotatably supported by a support shaft 78 centered on a rotation axis J2 extending in the lateral direction Y. The parking lock arm 77 includes a parking lock arm body 77*a* and a meshing portion 77*b*.

The parking lock arm body 77*a* extends from the support shaft 78 to one side (+X side) in the front-rear direction. An end portion 77*c* on one side in the front-rear direction of the parking lock arm body 77*a* is in contact with the movable portion 70*a* from above. The meshing portion 77*b* protrudes upward from the parking lock arm body 77*a*. A winding spring (not illustrated) is attached to the support shaft 78. The winding spring (not illustrated) applies an elastic force in a clockwise direction as viewed from the other side (−Y side) in the lateral direction around the rotation axis J2 to the parking lock arm 77.

The parking lock arm 77 moves with the movement of the movable portion 70*a*. More specifically, the parking lock arm 77 rotates about the rotation axis J2 along with the movement of the rod 72 and the conical member 73 in the lateral direction Y. When the detent plate 71 rotates from the non-parking position to the parking position with the rotation of the output shaft 80, the rod 72 and the conical member 73 move to one side (+Y side) in the lateral direction.

The outer diameter of the tapered surface 73*a* of the conical member 73 increases from one side (+Y side) in the lateral direction toward the other side (−Y side) in the lateral direction. Therefore, when the conical member 73 moves to one side in the lateral direction, the end portion 77*c* of the parking lock arm 77 is lifted upward by the tapered surface 73*a*, and the parking lock arm 77 rotates counterclockwise about the rotation axis J2 as viewed from the other side (−Y side) in the lateral direction. As a result, although not illustrated, the meshing portion 77*b* approaches the parking lock gear 6 and meshes between the tooth portions 6*a* of the parking lock gear 6.

When the parking lock gear 6 and the parking lock arm 77 mesh with each other, the conical member 73 is also in a state of being located at the parking position, and the entire movable portion 70*a* is in a state of being located at the parking position. That is, the parking lock arm 77 meshes with the parking lock gear 6 connected to the axle when the movable portion 70*a* is located at the parking position. The conical member 73 is sandwiched in a state of being in contact with a contact portion 75*b*, which will be described later, of the support member 75 and the parking lock arm 77 at the parking position. When the parking lock arm 77 meshes with the parking lock gear 6, the parking lock gear 6 enters a locked state.

When the parking lock arm 77 approaches the parking lock gear 6, the meshing portion 77*b* may come into contact with the tooth portion 6*a* depending on the position of the tooth portion 6*a* of the parking lock gear 6. In this case, the parking lock arm 77 may not be able to move to a position where the meshing portion 77*b* meshes between the tooth portions 6*a*. Even in such a case, in the present example embodiment, since the conical member 73 is movable in the lateral direction Y with respect to the rod 72, it is possible to allow a state in which the conical member 73 is in a state of being located on the other side (−Y side) in the lateral direction with respect to the parking position while the rod 72 moves to the parking position. As a result, it is possible to suppress inhibition of the rotation of the output shaft 80 and to suppress application of a load to the motor unit 10 that rotates the output shaft 80.

In a state where the rod 72 is located at the parking position and the conical member 73 is in a state of being located on the other side (−Y side) in the lateral direction with respect to the parking position, the coil spring 74 is in a state of being compressed and deformed. Therefore, an elastic force in one lateral direction (+Y side direction) is applied to the conical member 73 by the coil spring 74. As a result, a rotational moment in a direction of rotating counterclockwise as viewed from the other side (−Y side) in the lateral direction around the rotation axis J2 is applied from the coil spring 74 to the parking lock arm 77 via the conical member 73. Therefore, when the parking lock gear 6 rotates and the position of the tooth portion 6a is displaced, the parking lock arm 77 rotates and the meshing portion 77b meshes between the tooth portions 6a.

When the detent plate 71 rotates from the parking position to the non-parking position with the rotation of the output shaft 80, the rod 72 and the conical member 73 move to the other side (−Y side) in the lateral direction. When the conical member 73 moves to the other side in the lateral direction, the end portion 77c of the parking lock arm 77 lifted by the conical member 73 receives its own weight and an elastic force from a winding spring (not illustrated) and moves downward, and the parking lock arm 77 rotates counterclockwise as viewed from one side (+Y side) in the lateral direction about the rotation axis J2. As a result, the meshing portion 77b of the parking lock arm 77 is separated from the parking lock gear 6 and is disengaged from between the tooth portions 6a. FIG. 2 illustrates the parking lock arm 77 in a state of being disengaged from the parking lock gear 6.

When the parking lock arm 77 is detached from the parking lock gear 6, the conical member 73 is also in a state of being located at the non-parking position, and the entire movable portion 70a is in a state of being located at the non-parking position. That is, the parking lock arm 77 is disengaged from the parking lock gear 6 when the movable portion 70a is located at the non-parking position. The conical member 73 is located on the other side (−Y side) in the lateral direction with respect to the parking lock arm 77 in the non-parking position. When the parking lock arm 77 is disengaged from the parking lock gear 6, the parking lock gear 6 is unlocked.

The support member 75 supports the movable portion 70a so as to be movable in the lateral direction Y. In the present example embodiment, the support member 75 supports the movable portion 70a from below. The support member 75 is fixed to the inner surface of the housing 2. The support member 75 includes a base portion 75a, a contact portion 75b, and a leaf spring fixing portion 75c.

In the present example embodiment, the base portion 75a has a plate shape whose plate surface faces the vertical direction Z. The contact portion 75b protrudes upward from the base portion 75a. The contact portion 75b is a portion that comes into contact with the movable portion 70a and supports the movable portion 70a. In the present example embodiment, the contact portion 75b comes into contact with the conical member 73 of the movable portion 70a from below to support the movable portion 70a from below. The surface of the contact portion 75b on the movable portion 70a side is an arc-shaped curved surface that is concave to the opposite side to the movable portion 70a side as viewed along the lateral direction Y. Therefore, the conical member 73 having the tapered surface 73a can be stably supported.

The leaf spring fixing portion 75c protrudes upward from the base portion 75a. The leaf spring fixing portion 75c has, for example, a rectangular parallelepiped shape. The leaf spring fixing portion 75c is located on one side (+X side) in the front-rear direction with respect to the contact portion 75b. The leaf spring 76 is fixed to the leaf spring fixing portion 75c of the support member 75. In the present example embodiment, the leaf spring 76 is fixed to the end portion on the other side (−Y side) in the lateral direction of the upper surface of the leaf spring fixing portion 75c. The leaf spring 76 includes a leaf spring body 76a and a contacted portion 76b.

The leaf spring body 76a has a plate shape with a plate surface facing the vertical direction Z. The leaf spring body 76a extends from the leaf spring fixing portion 75c toward the other side (−Y side) in the lateral direction. The leaf spring body 76a extends to the upper side of the detent plate 71. The leaf spring body 76a has a slit 76c at the end portion on the other side in the lateral direction. The slit 76c penetrates the leaf spring body 76a in the vertical direction Z. The slit 76c extends in the lateral direction Y. The slit 76c extends to the end portion on the other side in the lateral direction of the leaf spring body 76a, and bifurcates the end portion on the other side in the lateral direction of the leaf spring body 76a.

The contacted portion 76b is provided at an end portion on the other side (−Y side) in the lateral direction of the leaf spring body 76a. In the present example embodiment, the contacted portion 76b is a roller attached to the leaf spring body 76a so as to be rotatable about an axis extending in the front-rear direction X. The contacted portion 76b is provided between the tip portions of the leaf spring body 76a bifurcated by the slit 76c. The contacted portion 76b is brought into contact with any one of the first valley portion 71a and the second valley portion 71b by an elastic force generated in the leaf spring 76 along with the rotation of the detent plate 71. When the movable portion 70a is located at the parking position, the contacted portion 76b is brought into contact with the first valley portion 71a and is hooked on the inner surface of the first valley portion 71a in the lateral direction Y. Accordingly, the detent plate 71 and the rod 72 can be maintained at the parking position.

In particular, when the coil spring 74 is provided as in the present example embodiment, the reaction force due to the elastic force generated by the coil spring 74 compressed and deformed when the meshing portion 77b is brought into contact with the tooth portion 6a is applied to the rod 72 and the detent plate 71 in the other side in the lateral direction (−Y side direction). According to the present example embodiment, even in such a case, the contacted portion 76b is hooked on the first valley portion 71a, whereby the detent plate 71 can be prevented from moving to the other side (−Y side) in the lateral direction. Therefore, the detent plate 71 and the rod 72 can be stably maintained at the parking position.

On the other hand, when the output shaft 80 is rotated by the motor unit 10 and the detent plate 71 moves from the parking position to the non-parking position, the leaf spring body 76a is pushed upward by the crest portion 71c of the detent plate 71 and elastically deformed. As a result, the contacted portion 76b is disengaged from the first valley portion 71a. When the movable portion 70a is located at the non-parking position, the contacted portion 76b is brought into contact with the second valley portion 71b and is hooked on the inner surface of the second valley portion 71b in the lateral direction Y. Accordingly, the detent plate 71 and the rod 72 can be maintained at the non-parking position.

In the present example embodiment, when the contacted portion 76b moves between the first valley portion 71a and the second valley portion 71b, the contacted portion 76b relatively moves from the inside of one valley portion over the crest portion 71c to the other valley portion. When the contacted portion 76b gets over the crest portion 71c, the leaf spring 76 receives an upward force from the crest portion 71c via the contacted portion 76b and elastically deforms. That is, in the present example embodiment, the leaf spring 76 is an elastic portion that is pushed upward and elastically deformed by the crest portion 71c of the detent plate 71 when the movable portion 70a moves between the non-parking position and the parking position. As described above, the leaf spring 76 in the present example embodiment is an elastic portion having the contacted portion 76b that is brought into contact with any one of the plurality of valley portions by the elastic force generated by the rotation of the detent plate 71. In the present example embodiment, when the contacted portion 76b moves between the first valley portion 71a and the second valley portion 71b, the contacted portion 76b as a roller moves while rolling on the upper end surface of the detent plate 71.

The motor unit 10 drives the parking switching mechanism 70 based on a shift operation of the vehicle. In the present example embodiment, the motor unit 10 drives the parking switching mechanism 70 by moving the movable portion 70a in the lateral direction Y via the output shaft 80, and switches the parking lock gear 6 between the locked state and the unlocked state.

As illustrated in FIG. 1, the motor unit 10 includes a motor 20 and a speed reducer 30. The speed reducer 30 is connected to the motor 20. The motor 20 rotates the output shaft 80 via the speed reducer 30. The motor 20 is, for example, a three-phase brushless DC motor. The speed reducer 30 decelerates the rotation of the motor 20. The output shaft 80 is connected to the speed reducer 30. The decelerated rotation of the motor 20 is transmitted to the output shaft 80 via the speed reducer 30. That is, the output shaft 80 is driven by the motor 20 via the speed reducer 30.

Figure 3:
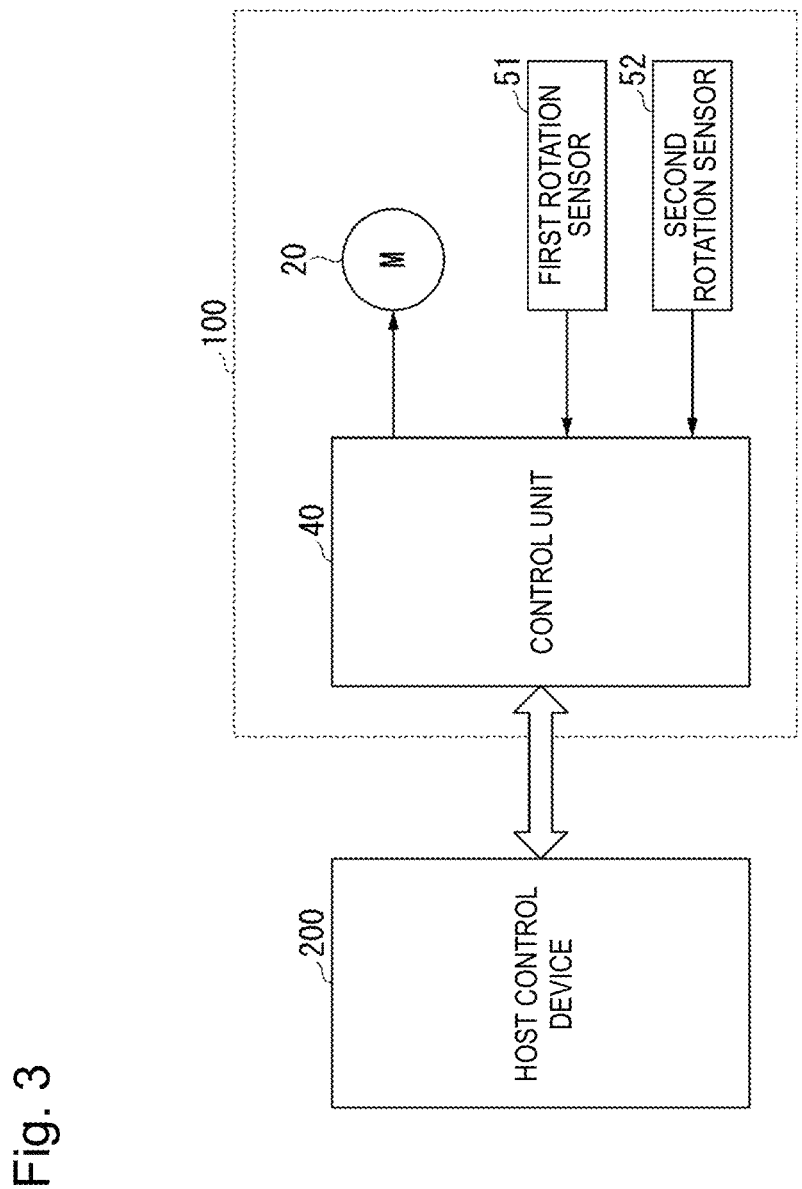
FIG. 3 is a block diagram illustrating a functional configuration of an electric actuator according to an example embodiment of the present invention.

As illustrated in FIG. 3, the electric actuator 100 includes a first rotation sensor 51, a second rotation sensor 52, and a controller 40 in addition to the motor unit 10, the parking switching mechanism 70, and the output shaft 80. The controller 40 is communicably connected to a host control device 200 via a communication cable (not illustrated). The host control device 200 is, for example, an electronic controller (ECU) mounted on a vehicle.

The first rotation sensor 51 detects a first rotation angle φ that is a rotation angle of the motor 20. The first rotation sensor 51 outputs a signal indicating the detection result of the first rotation angle φ to the controller 40. The second rotation sensor 52 detects a second rotation angle θ which is a rotation angle of the output shaft 80. The second rotation sensor 52 outputs a signal indicating the detection result of the second rotation angle θ to the controller 40. The first rotation sensor 51 and the second rotation sensor 52 are, for example, a Hall sensor, an incremental encoder, or an absolute encoder. In the following description, the first rotation angle φ may be referred to as a motor rotation angle, and the second rotation angle θ may be referred to as an output shaft rotation angle.

The controller 40 controls the motor 20 on the basis of the detection results of the motor rotation angle φ and the output shaft rotation angle θ. The controller 40 communicates with the host control device 200 according to a predetermined communication protocol. The predetermined communication protocol is, for example, a controller area network (CAN) communication protocol. The controller 40 is, for example, a microprocessor such as a microcontroller unit (MCU). When receiving a shift position switching instruction from the host control device 200, the controller 40 executes a shift position switching process illustrated in FIG. 4.

Figure 4:
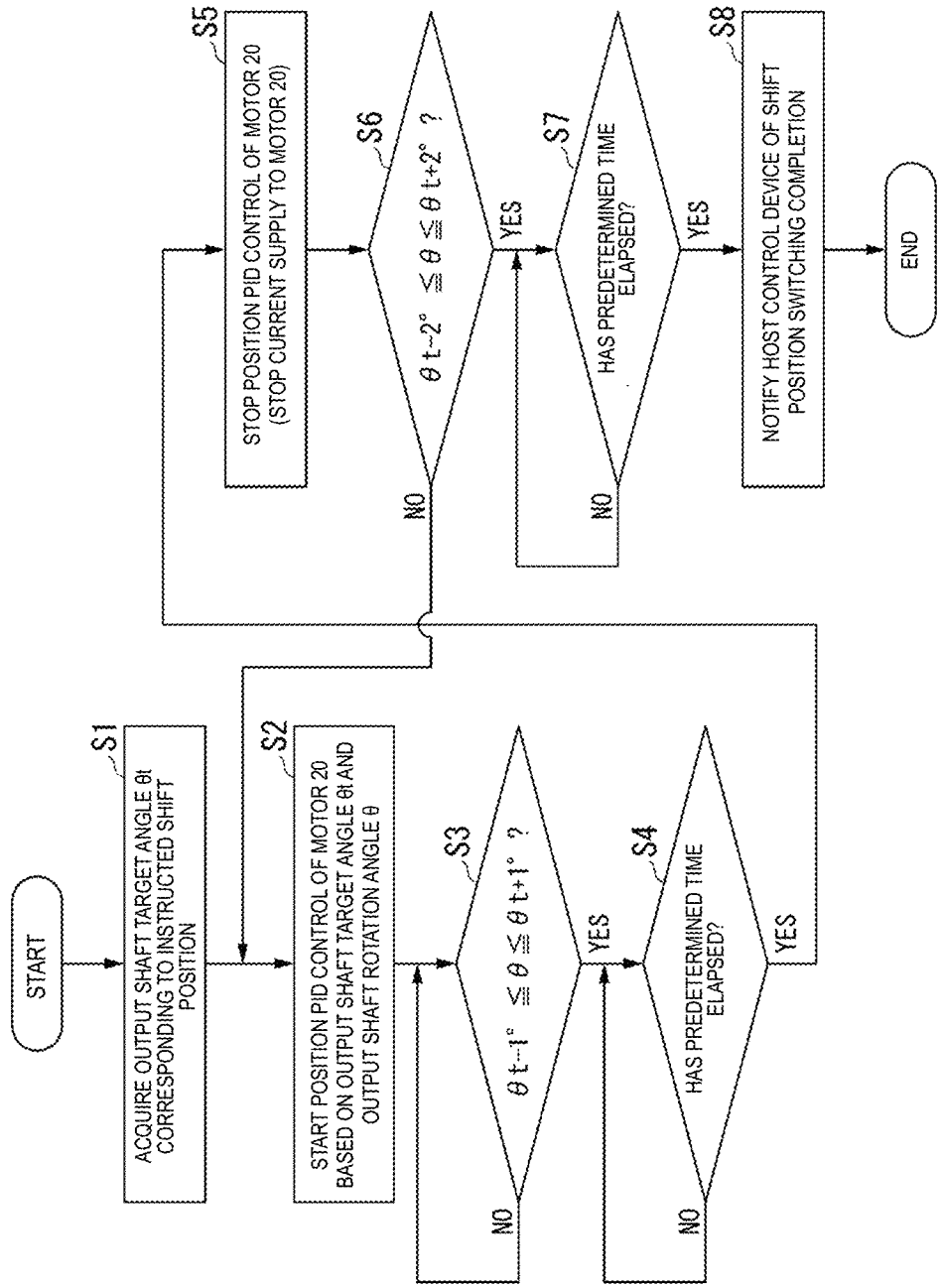
FIG. 4 is a flowchart illustrating a shift position switching process executed by a controller of an electric actuator according to an example embodiment of the present invention.

FIG. 4 is a flowchart illustrating a shift position switching process executed by the controller 40. As illustrated in FIG. 4, upon receiving a shift position switching instruction from the host control device 200, the controller 40 first acquires an output shaft target angle θt corresponding to the instructed shift position (Step S1). For example, table data indicating the correspondence relationship between the shift position and the output shaft target angle θt is stored in advance in the internal memory of the controller 40. The controller 40 refers to the table data stored in the internal memory to acquire the output shaft target angle θt corresponding to the instructed shift position.

Subsequently, the controller 40 starts the position PID control of the motor 20 based on the output shaft target angle θt and the output shaft rotation angle θ detected by the second rotation sensor 52 (Step S2). Specifically, the controller 40 calculates an operation amount at which the deviation between the output shaft target angle θt and the output shaft rotation angle θ becomes 0 by PID calculation, and supplies a drive current corresponding to the calculated operation amount to the motor 20 to rotate the motor 20. As a result, the output shaft 80 rotates clockwise or counterclockwise toward the output shaft target angle θt corresponding to the instructed shift position.

In the present example embodiment, "the output shaft 80 rotates clockwise" means that the output shaft 80 rotates clockwise about the central axis J1 as viewed from one side (+X side) in the front-rear direction. That is, the clockwise direction is opposite to the direction in which the arrow indicating the rotation angle θ of the output shaft 80 is directed in FIG. 2. In the present example embodiment, "the output shaft 80 rotates counterclockwise" means that the output shaft 80 rotates counterclockwise about the central axis J1 as viewed from one side (+X side) in the front-rear direction. That is, the counterclockwise direction is the same as the direction in which the arrow indicating the rotation angle θ of the output shaft 80 is directed in FIG. 2.

For example, when the shift position before the shift position switching process is executed is the non-parking position, the contacted portion 76b of the leaf spring 76 is located in the second valley portion 71b of the detent plate 71 before the shift position switching process is executed. In this case, if switching to the parking position is instructed from the host control device 200, the controller 40 calculates an operation amount at which a deviation between the output shaft target angle θt corresponding to the parking position and the output shaft rotation angle θ becomes 0 by PID calculation, and supplies a drive current corresponding to the calculated operation amount to the motor 20 to rotate the motor 20. As a result, the output shaft 80 rotates clockwise toward the output shaft target angle θt corresponding to the parking position.

As described above, when the output shaft 80 rotates clockwise toward the output shaft target angle θt corresponding to the parking position, the detent plate 71 sharing the central axis J1 with the output shaft 80 also rotates clockwise toward the output shaft target angle θt corresponding to the parking position. When the detent plate 71 rotates clockwise toward the output shaft target angle θt corresponding to the parking position, the leaf spring body 76a is pushed upward by the crest portion 71c of the detent plate 71 and elastically deformed. As a result, as illustrated in "State A" in FIG. 5, the contacted portion 76b is disengaged from the second valley portion 71b corresponding to the non-parking position, and moves while rolling from the second valley portion 71b toward the first valley portion 71a along the upper end surface of the detent plate 71. When the detent plate 71 rotates clockwise toward the output shaft target angle θt corresponding to the parking position, the rod 72 and the conical member 73 move from the non-parking position toward the parking position along the lateral direction Y.

While performing the position PID control of the motor 20, the controller 40 determines whether the output shaft rotation angle θ detected by the second rotation sensor 52 satisfies the following conditional expression (1) (Step S3). In other words, in Step S3, the controller 40 determines whether the output shaft rotation angle θ falls within a tolerance in which the output shaft target angle θt is set as a reference value and ±1° is set as an allowable error. In the following conditional expression (1), the allowable error is set to ±1° as an example, but the value of the allowable error is not limited to ±1°.

$$\theta t-1°\leq\theta\leq\theta t+1° \quad (1)$$

In the case of "No" in Step S3, that is, in the case where the output shaft rotation angle θ detected by the second rotation sensor 52 does not satisfy the conditional expression (1), it is estimated that the contacted portion 76b is not located within the range of ±1° centered on the valley portion corresponding to the instructed shift position among the plurality of valley portions of the detent plate 71. In this case, the controller 40 repeats the process of Step S3 at regular time intervals while performing the position PID control of the motor 20.

On the other hand, in the case of "Yes" in Step S3, that is, in a case where the output shaft rotation angle θ detected by the second rotation sensor 52 satisfies the conditional expression (1), it is estimated that the contacted portion 76b is located within a range of ±1° centered on the valley portion corresponding to the instructed shift position among the plurality of valley portions of the detent plate 71. In this case, the controller 40 determines whether a predetermined time has elapsed in a state where the output shaft rotation angle θ satisfies the conditional expression (1) (Step S4). In other words, in Step S4, the controller 40 determines whether a predetermined time has elapsed in a state where the contacted portion 76b is located within a range of ±1° centered on the valley portion corresponding to the instructed shift position. As an example, the predetermined time in Step S4 is 20 milliseconds, but the predetermined time is not limited to 20 milliseconds.

Figure 5:
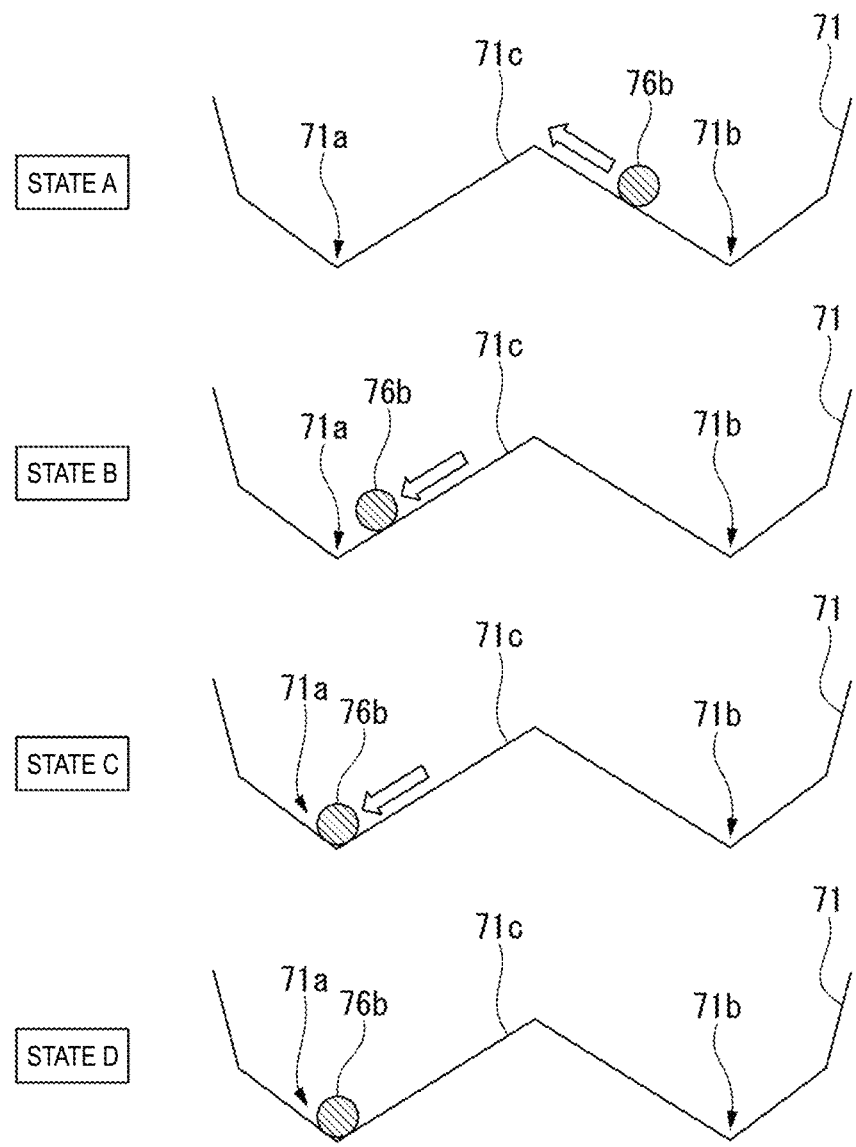
FIG. 5 is a view schematically illustrating a state in which a contacted portion of a leaf spring moves along an upper end surface of a detent plate during a period in which a shift position switching process is executed according to an example embodiment of the present invention.

For example, as described above, when the instructed shift position is the parking position and the detent plate 71 continues to rotate clockwise toward the output shaft target angle θt corresponding to the parking position, the contacted portion 76b gets over the crest portion 71c of the detent plate 71 and enters within the range of ±1° centered on the first valley portion 71a corresponding to the parking position as illustrated in "State B" of FIG. 5. As described above, when the contacted portion 76b enters the range of ±1° centered on the first valley portion 71a, that is, when the output shaft rotation angle θ detected by the second rotation sensor 52 satisfies the conditional expression (1), the controller 40 starts time counting and determines whether a predetermined time has elapsed in a state where the contacted portion 76b is located within the range of ±1° centered on the first valley portion 71a.

In the case of "No" in Step S4 described above, that is, in a case where the predetermined time has not elapsed in a state where the output shaft rotation angle θ satisfies the conditional expression (1), the controller 40 repeats the process of Step S4 at regular time intervals until the predetermined time elapses. On the other hand, in the case of "Yes" in Step S4, that is, in a case where the predetermined time has elapsed with the output shaft rotation angle θ satisfying the conditional expression (1), the controller 40 stops the position PID control of the motor 20 to stop the supply of the drive current to the motor 20 (Step S5).

When the supply of the drive current to the motor 20 is stopped, the torque of the motor 20 becomes 0, so that the output shaft 80 and the detent plate 71 are freely rotatable. On the other hand, the leaf spring body 76a is pushed upward by the crest portion 71c of the detent plate 71 and elastically deformed, thereby generating a downward elastic force to press the contacted portion 76b against the upper end surface of the detent plate 71. Therefore, when the detent plate 71 is freely rotatable while the contacted portion 76b is located within the range of ±1° centered on the valley portion corresponding to the instructed shift position, the detent plate 71 rotates by the downward elastic force generated in the leaf spring body 76a, and as a result, the contacted portion 76b moves while rolling along the upper end surface of the detent plate 71 toward the valley portion.

For example, as described above, in a case where the instructed shift position is the parking position, as indicated by "State B" in FIG. 5, when the detent plate 71 is in a state of being freely rotatable while the contacted portion 76b is located within a range of ±1° centered on the first valley portion 71a corresponding to the parking position, the detent plate 71 rotates clockwise by the downward elastic force generated in the leaf spring body 76a. As a result, as indicated by "State C" in FIG. 5, the contacted portion 76b moves along the upper end surface of the detent plate 71 while rolling toward the first valley portion 71a.

After stopping the supply of the drive current to the motor 20, the controller 40 determines whether the output shaft rotation angle θ detected by the second rotation sensor 52 satisfies the following conditional expression (2) (Step S6). In other words, in Step S6, the controller 40 determines whether the output shaft rotation angle θ falls within a tolerance in which the output shaft target angle θt is set as a reference value and ±2° is set as an allowable error. In the following conditional expression (2), the allowable error is set to ±2° as an example, but the value of the allowable error is not limited to ±2°. However, for the reasons described later, the allowable error in the conditional expression (2) is preferably set to a value larger than the allowable error in the conditional expression (1).

$$\theta t-2°\leq\theta\leq\theta t+2° \quad (2)$$

In the case of "No" in Step S6, that is, in a case where the output shaft rotation angle θ detected by the second rotation sensor 52 does not satisfy the conditional expression (2), it is estimated that the contacted portion 76b is not located within the range of ±2° centered on the valley portion corresponding to the instructed shift position among the plurality of valley portions of the detent plate 71. In this case, the controller 40 returns to the process of Step S2 and starts the position PID control of the motor 20 again.

As described above, when the supply of the drive current to the motor 20 is stopped, the output shaft 80 and the detent plate 71 are freely rotatable. Therefore, after the supply of the drive current to the motor 20 is stopped, there is a possibility that the detent plate 71 is largely rotated by the downward elastic force generated in the leaf spring body 76a, and the contacted portion 76b moves to a position largely disengaged from the valley portion corresponding to the instructed shift position. Therefore, when the output shaft rotation angle θ does not satisfy the conditional expression (2) after stopping the supply of the drive current to the motor 20, that is, when it is estimated that the contacted portion 76b has moved to a position largely disengaged from the valley portion corresponding to the instructed shift position due to the stop of the supply of the drive current to the motor 20, the controller 40 retries the switching of the shift position by restarting the position PID control of the motor 20. The reason why the allowable error in the conditional expression (2) is set to a value larger than the allowable error in the conditional expression (1) is to accurately detect that the contacted portion 76b has moved to a position largely disengaged from the valley portion corresponding to the instructed shift position due to the stop of the supply of the drive current to the motor 20.

On the other hand, in the case of "Yes" in Step S6, that is, in a case where the output shaft rotation angle θ detected by the second rotation sensor 52 satisfies the conditional expression (2), it is estimated that the contacted portion 76b is located within a range of ±2° centered on the valley portion corresponding to the instructed shift position among the plurality of valley portions of the detent plate 71. In this case, the controller 40 determines whether a predetermined time has elapsed in a state where the output shaft rotation angle θ satisfies the conditional expression (2) (Step S7). In other words, in Step S7, the controller 40 determines whether a predetermined time has elapsed in a state where the contacted portion 76b is located within a range of ±2° centered on the valley portion corresponding to the instructed shift position. As an example, the predetermined time in Step S7 is 20 milliseconds, but the predetermined time is not limited to 20 milliseconds.

For example, as described above, in a case where the instructed shift position is the parking position, as indicated by "State C" in FIG. 5, when the supply of the drive current to the motor 20 is stopped while the contacted portion 76b is located within a range of ±1° centered on the first valley portion 71a corresponding to the parking position, the detent plate 71 rotates clockwise by the downward elastic force generated in the leaf spring body 76a. As a result, the contacted portion 76b moves along the upper end surface of the detent plate 71 while rolling toward the first valley portion 71a. Then, as indicated by "State D" in FIG. 5, when the contacted portion 76b reaches the first valley portion 71a, the contacted portion 76b is hooked on the inner surface of the first valley portion 71a in the lateral direction Y, whereby the detent plate 71 stops. As a result, the detent plate 71 and the movable portion 70a (rod 72, conical member 73) are in a state of being located at the parking position, and the parking lock gear 6 is locked by the parking lock arm 77.

That is, it is possible to determine whether the detent plate 71 and the movable portion 70a are in a state of being located at the instructed shift position by determining whether the predetermined time has elapsed in a state where the output shaft rotation angle θ satisfies the conditional expression (2) after the supply of the drive current to the motor 20 is stopped.

In the case of "No" in Step S7, that is, in a case where the predetermined time has not elapsed in a state where the output shaft rotation angle θ satisfies the conditional expression (2), it is estimated that the contacted portion 76b has not reached the valley portion corresponding to the instructed shift position, and the detent plate 71 and the movable portion 70a are not in a state of being located at the instructed shift position. In this case, the controller 40 repeats the process of Step S7 at regular time intervals until a predetermined time elapses.

On the other hand, in the case of "Yes" in Step S7, that is, in a case where the predetermined time has elapsed in a state where the output shaft rotation angle θ satisfies the conditional expression (2), it is estimated that the contacted portion 76b reaches the valley portion corresponding to the instructed shift position, and the detent plate 71 and the movable portion 70a are also in a state of being located at the instructed shift position. In this case, the controller 40 determines that the switching of the shift position has ended, and notifies the host control device 200 that the switching of the shift position has ended (Step S8).

Although the shift position switching process executed by the controller 40 has been described above, as can be understood from the above description, when an abnormality such as a failure occurs in the second rotation sensor 52, the output shaft rotation angle θ cannot be detected, so that the controller 40 cannot execute the shift position switching process. Therefore, in a case where the controller 40 in the present example embodiment detects that an abnormality has occurred in the second rotation sensor 52 by performing an initial process at the time of activation, for example, the controller notifies the host control device 200 that an abnormality has occurred in the second rotation sensor 52. Then, when receiving a parking position learning instruction from the host control device 200, the controller 40 executes the parking position learning process illustrated in FIG. 6. The parking position learning process is a process of learning the motor rotation angle φ corresponding to the parking position as the reference position as a parking position angle.

Figure 6:
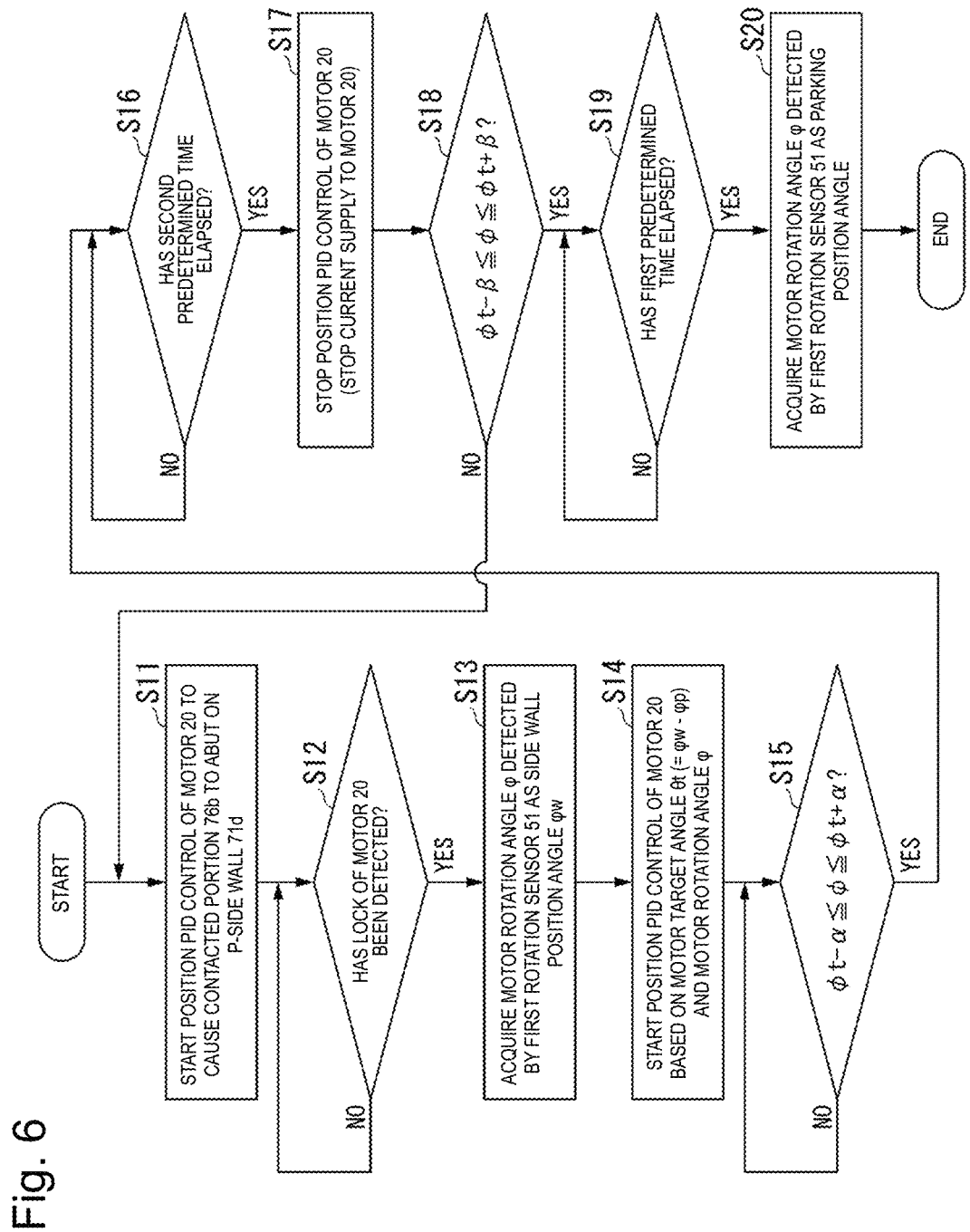
FIG. 6 is a flowchart illustrating a parking position learning process executed by a controller of an electric actuator according to an example embodiment of the present invention.

FIG. 6 is a flowchart illustrating a parking position learning process executed by the controller 40. As illustrated in FIG. 6, when receiving the parking position learning instruction from the host control device 200, the controller 40 first starts the position PID control of the motor 20 and rotates the motor 20 to execute a process of abutting the contacted portion 76b against a first side wall portion 71d located one end side in the circumferential direction of the first valley portion 71a in the detent plate 71 (Step S11). In the following description, the first side wall portion 71d may be referred to as a "P-side wall".

For example, in the internal memory of the controller 40, a side wall target angle φtw, which is a target value of the motor rotation angle φ necessary for abutting the contacted portion 76b against the P-side wall 71d, is stored in advance. In Step S11, the controller 40 calculates an operation amount at which a deviation between the side wall target angle φtw stored in the internal memory and the motor rotation angle φ detected by the first rotation sensor 51 becomes 0 by PID calculation, and supplies a drive current corresponding to the calculated operation amount to the motor 20 to rotate the motor 20. As a result, the output shaft 80 and the detent plate 71 rotate clockwise, which is the direction in which the contacted portion 76b moves toward the P-side wall 71d.

In the present example embodiment, since the motor 20 is connected to the output shaft 80 via the speed reducer 30, the motor rotation angle φ, which is the rotation angle of the motor 20, does not coincide with the output shaft rotation angle θ, which is the rotation angle of the output shaft 80 and the detent plate 71. Therefore, in order to control the output shaft rotation angle θ by the position PID control of the motor 20 based on the motor rotation angle φ, it is necessary to convert the motor rotation angle φ and the side wall target angle φtw that is the target value thereof into the output shaft rotation angle θ. Hereinafter, for simplification of description, it is assumed that the motor rotation angle φ coincides with the output shaft rotation angle θ. That is, in the following description, the controller 40 does not need to convert the motor rotation angle φ or the like into the output shaft rotation angle θ.

Figure 7:
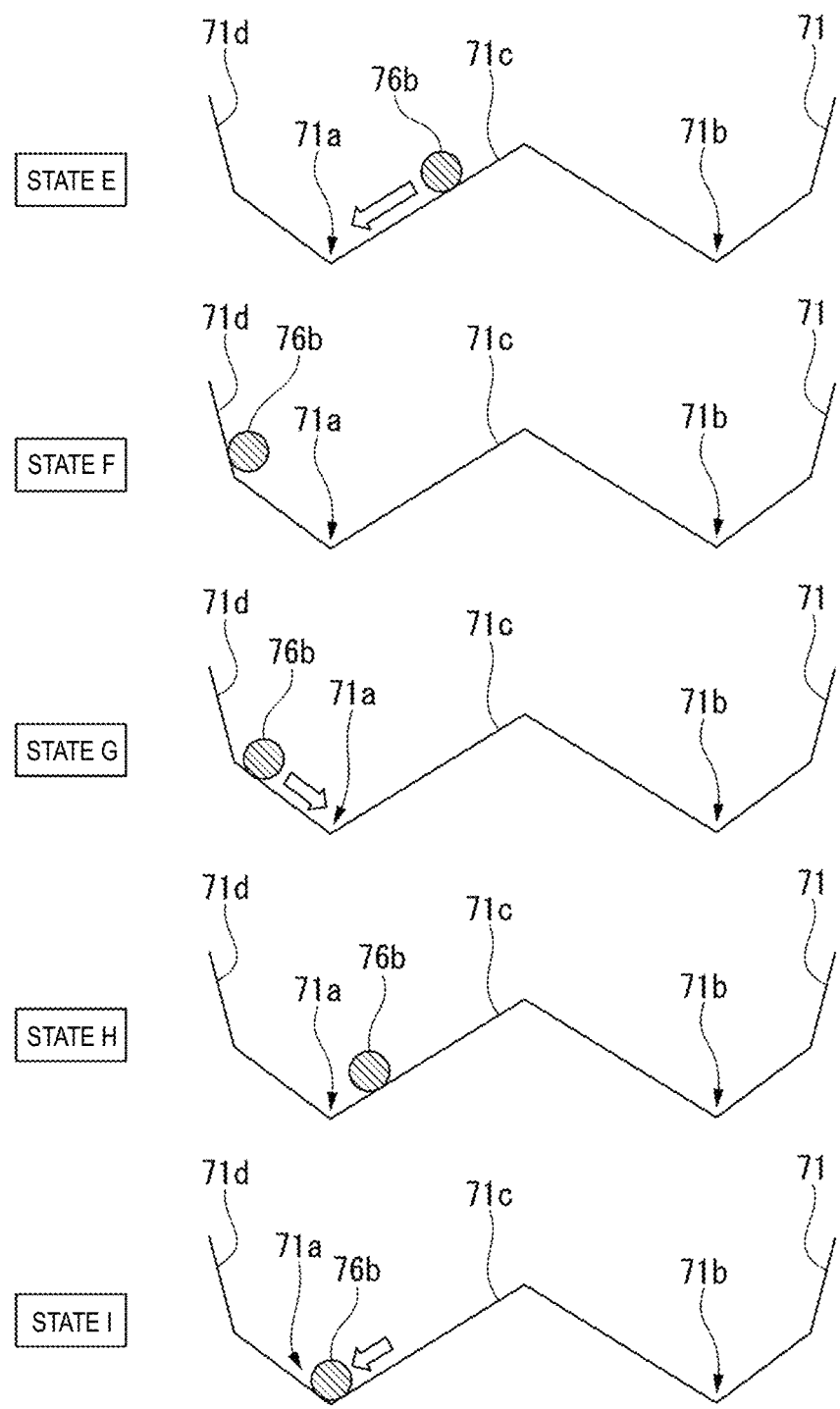
FIG. 7 is a view schematically illustrating a state in which a contacted portion of a leaf spring moves along an upper end surface of a detent plate during a period in which a parking position learning process is executed according to an example embodiment of the present invention.

As indicated by "State E" in FIG. 7, when the detent plate 71 rotates clockwise, the contacted portion 76b moves along the upper end surface of the detent plate 71 while rolling toward the P-side wall 71d. Then, when a predetermined time elapses after the detent plate 71 starts rotating clockwise, the contacted portion 76b abuts on the P-side wall 71d as indicated by "State F" in FIG. 7, and the detent plate 71 stops. That is, when the contacted portion 76b abuts on the P-side wall 71d, the motor 20 enters the non-rotatable state (locked state).

While performing the position PID control of the motor 20 based on the motor rotation angle φ, the controller 40 determines whether the motor 20 is in the locked state based on the motor rotation angle φ detected by the first rotation sensor 51 (Step S12). For example, the controller 40 determines that the motor 20 is in the locked state when the motor rotation angle φ detected by the first rotation sensor 51 does not change or when the change in the motor rotation angle φ rapidly decreases.

In the case of "No" in Step S12, that is, in a case where the motor 20 is not in the locked state, it is estimated that the contacted portion 76b does not abut on the P-side wall 71d. In this case, the controller 40 repeats the process of Step S12 at regular time intervals while performing the position PID control of the motor 20.

On the other hand, in the case of "Yes" in Step S12, that is, in a case where the motor 20 is in the locked state, it is estimated that the contacted portion 76b abuts on the P-side wall 71d. In this case, the controller 40 executes a process of acquiring the motor rotation angle φ detected by the first rotation sensor 51 when the contacted portion 76b abuts on the P-side wall 71d as a side wall position angle φw (Step S13).

When acquiring the side wall position angle φw as described above, the controller 40 executes a reverse rotation process of reversely rotating the motor 20 to an angle at which the motor rotation angle φ corresponds to a target rotation angle φt with reference to the side wall position angle φw (Step S14). In the present example embodiment, the target rotation angle φt is a value obtained by subtracting a predetermined value φp of the rotation angle (motor rotation angle φ) from the P-side wall 71d to the first valley portion 71a from the side wall position angle φw. In Step S14, the controller 40 calculates an operation amount at which a deviation between the target rotation angle φpt (=φw−φp) and the motor rotation angle φ detected by the first rotation sensor 51 becomes 0 by PID calculation, and supplies a drive current corresponding to the calculated operation amount to the motor 20 to reversely rotate the motor 20. As a result, the output shaft 80 and the detent plate 71 rotate counterclockwise, which is the direction in which the contacted portion 76b moves from the P-side wall 71d to the first valley portion 71a.

As indicated by "State G" in FIG. 7, when the detent plate 71 rotates counterclockwise after the contacted portion 76b abuts on the P-side wall 71d, the contacted portion 76b moves from the P-side wall 71d toward the first valley portion 71a while rolling along the upper end surface of the detent plate 71.

The controller 40 determines whether the motor rotation angle φ detected by the first rotation sensor 51 satisfies the following conditional expression (3) while performing the position PID control of the motor 20 based on the motor rotation angle φ (Step S15). In other words, in Step S15, the controller 40 determines whether the motor rotation angle φ falls within a second tolerance in which the target rotation angle φt is set as the reference value and ±α is set as the allowable error. As an example, the value of α is 1°, but the value of α is not limited to 1°.

$$\varphi t - \alpha \le \varphi \le \varphi t + \alpha \quad (3)$$

In the case of "No" in Step S15, that is, in a case where the motor rotation angle φ detected by the first rotation sensor 51 does not satisfy the conditional expression (3), it is estimated that the contacted portion 76b is not located within the range of ±α centered on the first valley portion 71a corresponding to the parking position. In this case, the controller 40 repeats the process of Step S15 at regular time intervals while performing the position PID control of the motor 20.

On the other hand, in the case of "Yes" in Step S15, that is, in a case where the motor rotation angle φ detected by the first rotation sensor 51 does not satisfy the conditional expression (3), it is estimated that the contacted portion 76b is located within the range of ±α centered on the first valley portion 71a corresponding to the parking position. In this case, the controller 40 determines whether a second predetermined time has elapsed in a state where the motor rotation angle φ satisfies the conditional expression (3) (Step S16). In other words, in Step S16, the controller 40 determines whether the second predetermined time has elapsed in a state where the contacted portion 76b is located within a range of ±α centered on the first valley portion 71a corresponding to the parking position. As an example, the second predetermined time in Step S16 is 10 milliseconds, but the second predetermined time is not limited to 10 milliseconds.

As indicated by "State G" in FIG. 7, when the detent plate 71 continues to rotate counterclockwise after the contacted portion 76b abuts on the P-side wall 71d, the contacted portion 76b enters a range of ±α centered on the first valley portion 71a corresponding to the parking position. As described above, when the contacted portion 76b enters the range of ±α centered on the first valley portion 71a corresponding to the parking position, that is, when the motor rotation angle φ detected by the first rotation sensor 51 satisfies the conditional expression (3), the controller 40 starts time counting and determines whether the second predetermined time has elapsed in a state where the contacted portion 76b is located within the range of ±α centered on the first valley portion 71a.

In the case of "No" in Step S16, that is, in a case where the second predetermined time has not elapsed in a state where the motor rotation angle φ satisfies the conditional expression (3), the controller 40 repeats the process of Step S16 at regular time intervals until the second predetermined time elapses. On the other hand, in the case of "Yes" in Step S16, that is, in a case where the second predetermined time has elapsed with the motor rotation angle φ satisfying the conditional expression (3), the controller 40 stops the supply of the drive current to the motor 20 by stopping the position PID control of the motor 20 (Step S17).

In this manner, after executing the reverse rotation process, the controller 40 executes the process of stopping the control of the motor 20 when the motor rotation angle φ detected by the first rotation sensor 51 continues to fall within the second tolerance having the target rotation angle φt as the reference value within the second predetermined time. Although details will be described later, the controller 40 executes stationary determination process to be described later after stopping the control of the motor 20.

When the supply of the drive current to the motor 20 is stopped, the torque of the motor 20 becomes 0, so that the output shaft 80 and the detent plate 71 are freely rotatable. On the other hand, the leaf spring body 76a is pushed upward by the crest portion 71c of the detent plate 71 and elastically deformed, thereby generating a downward elastic force to press the contacted portion 76b against the upper end surface of the detent plate 71. Therefore, as indicated by "State H" in FIG. 7, when the detent plate 71 is freely rotatable while the contacted portion 76b is located within the range of ±α centered on the first valley portion 71a, the detent plate 71 rotates clockwise by the downward elastic force generated in the leaf spring body 76a. As a result, as indicated by "State I" in FIG. 7, the contacted portion 76b moves along the upper end surface of the detent plate 71 while rolling toward the first valley portion 71a.

After stopping the supply of the drive current to the motor 20, the controller 40 determines whether the motor rotation angle φ detected by the first rotation sensor 51 satisfies the following conditional expression (4) (Step S18). In other words, in Step S18, the controller 40 determines whether the motor rotation angle φ falls within a first tolerance in which the target rotation angle φt is set as the reference value and ±β is set as the allowable error. As an example, the value of β is 2°, but the value of β is not limited to 2°. However, for the reasons described later, the first tolerance (φt±β) is preferably larger than the second tolerance (φt±α). In other words, the allowable error β of the first tolerance is preferably larger than the allowable error α of the second tolerance.

$$\varphi t - \beta \leq \varphi \leq \varphi t + \beta \quad (4)$$

In the case of "No" in Step S18, that is, in a case where the motor rotation angle φ detected by the first rotation sensor 51 does not satisfy the conditional expression (4), it is estimated that the contacted portion 76b is not located within the range of ±β centered on the first valley portion 71a corresponding to the parking position. In this case, the controller 40 returns to the process of Step S11 and performs the process of abutting the contacted portion 76b on the P-side wall 71d again.

As described above, when the supply of the drive current to the motor 20 is stopped, the output shaft 80 and the detent plate 71 are freely rotatable. Therefore, after the supply of the drive current to the motor 20 is stopped, there is a possibility that the detent plate 71 is largely rotated by the downward elastic force generated in the leaf spring body 76a, and the contacted portion 76b moves to a position largely disengaged from the first valley portion 71a corresponding to the parking position. Therefore, when the motor rotation angle φ does not satisfy the conditional expression (4) after stopping the supply of the drive current to the motor 20, that is, when it is estimated that the contacted portion 76b has moved to a position greatly disengaged from the first valley portion 71a due to the stop of the supply of the drive current to the motor 20, the controller 40 retries the learning process of the parking position by executing the process of abutting the contacted portion 76b on the P-side wall 71d again. The reason why the first tolerance is preferably larger than the second tolerance is to accurately detect that the contacted portion 76b has moved to a position largely disengaged from the first valley portion 71a due to the stop of the supply of the drive current to the motor 20.

On the other hand, in the case of "Yes" in Step S18, that is, in a case where the motor rotation angle φ detected by the first rotation sensor 51 satisfies the conditional expression (4), it is estimated that the contacted portion 76b is located within the range of ±β centered on the first valley portion 71a. In this case, the controller 40 determines whether the first predetermined time has elapsed in a state where the motor rotation angle φ satisfies the conditional expression (4) (Step S19). In other words, in Step S19, the controller 40 determines whether the first predetermined time has elapsed in a state where the contacted portion 76b is located within a range of ±β centered on the first valley portion 71a. As an example, the first predetermined time in Step S19 is 20 milliseconds, but the first predetermined time is not limited to 20 milliseconds. However, the first predetermined time is preferably longer than the second predetermined time.

As indicated by "State H" in FIG. 7, when the detent plate 71 is freely rotatable while the contacted portion 76b is located within the range of ±α centered on the first valley portion 71a, the detent plate 71 rotates clockwise by the downward elastic force generated in the leaf spring body 76a. As a result, as indicated by "State I" in FIG. 7, the contacted portion 76b moves along the upper end surface of the detent plate 71 while rolling toward the first valley portion 71a. Then, when the contacted portion 76b reaches the first valley portion 71a, the contacted portion 76b is hooked on the inner surface of the first valley portion 71a in the lateral direction Y, whereby the detent plate 71 stops. As a result, the detent plate 71 and the movable portion 70a (rod 72, conical member 73) are in a state of being located at the parking position, and the parking lock gear 6 is locked by the parking lock arm 77.

That is, it is possible to determine whether the detent plate 71 and the movable portion 70a are in a state of being located at the parking position by determining whether a first predetermined time has elapsed in a state where the output motor rotation angle φ satisfies the conditional expression (4) after the supply of the drive current to the motor 20 is stopped. Since the first predetermined time is longer than the second predetermined time, the time for the contacted portion 76b to move to the first valley portion 71a is sufficiently secured, and thus, it is possible to more accurately determine that the contacted portion 76b has reached the first valley portion 71a and the detent plate 71 and the movable portion 70a are in a state of being located at the parking position.

In the case of "No" in Step S19, that is, in a case where the first predetermined time has not elapsed in a state where the motor rotation angle φ satisfies the conditional expression (4), it is estimated that the contacted portion 76b has not reached the first valley portion 71a corresponding to the parking position, and the detent plate 71 and the movable portion 70a are not in a state of being located at the parking position. In this case, the controller 40 repeats the process of Step S19 at regular time intervals until the first predetermined time elapses.

On the other hand, in the case of "Yes" in Step S19, that is, in a case where the first predetermined time has elapsed in a state where the motor rotation angle φ satisfies the conditional expression (4), it is estimated that the contacted portion 76b reaches the first valley portion 71a corresponding to the parking position, and the detent plate 71 and the movable portion 70a are also in a state of being located at the parking position. In this case, the controller 40 determines that the contacted portion 76b is stationary at the parking position, and acquires (learns) the motor rotation angle φ detected by the first rotation sensor 51 at this time as the parking position angle (Step S20). As described above, when the motor rotation angle φ detected by the first rotation sensor 51 continues to fall within the first tolerance having the target rotation angle φt as the reference value within the first predetermined time, the controller 40 executes the stationary determination process of determining that the contacted portion 76b is stationary at the parking position.

As described above, when an abnormality occurs in the second rotation sensor 52, the controller 40 executes the parking position learning process to learn the motor rotation angle φ corresponding to the parking position that is the reference position as the parking position angle. When receiving the shift position switching instruction from the host control device 200, the controller 40 switches the shift position by performing position PID control of the motor 20 based on the parking position angle obtained by the parking position learning process and the motor rotation angle φ detected by the first rotation sensor 51. When the motor rotation angle φ does not coincide with the output shaft rotation angle θ, process of converting the parking position angle and the motor rotation angle φ into the output shaft rotation angle θ may be performed.

As described above, in the present example embodiment, in a case where an abnormality has occurred in the second rotation sensor 52, the controller 40 executes a process of causing the motor 20 to rotate so as to cause the contacted portion 76b to abut the P-side wall 71d of the detent plate 71, a process of acquiring the motor rotation angle φ detected by the first rotation sensor 51 when the contacted portion 76b abuts on the P-side wall 71d as the side wall position angle φw, a reverse rotation process of reversely rotating the motor 20 to an angle at which the motor rotation angle φ corresponds to the target rotation angle φt based on the side wall position angle φw, and a stationary determination process of determining that the contacted portion 76b is stationary at the parking position when the motor rotation angle φ detected by the first rotation sensor 51 continues to fall within the first tolerance having the target rotation angle φt as a reference value within the first predetermined time.

According to the present example embodiment, even when an abnormality occurs in the second rotation sensor 52 that detects the output shaft rotation angle θ, it is possible to accurately determine that the contacted portion 76b is stationary in the first valley portion corresponding to the parking position among the plurality of valley portions provided in the detent plate 71 based on the motor rotation angle φ detected by the first rotation sensor 51. By learning the motor rotation angle φ detected by the first rotation sensor 51 when it is determined that the contacted portion 76b is stationary at the parking position as the parking position angle, learning accuracy of the parking position angle corresponding to the parking position which is the reference position can be improved.

In the present example embodiment, after executing the reverse rotation process, the controller 40 executes a process of stopping the control of the motor 20 in a case where the motor rotation angle φ detected by the first rotation sensor 51 continues to fall within the second tolerance having the target rotation angle φt as the reference value within the second predetermined time, and executes the above-described stationary determination process after stopping the control of the motor 20.

As a result, since it is determined that the contacted portion 76b is stationary at the parking position by the two-stage determination, it is possible to more accurately determine that the contacted portion 76b is stationary at the first valley portion corresponding to the parking position.

In the present example embodiment, the first tolerance (φt±β) is larger than the second tolerance (φt±α).

As a result, it is possible to accurately detect that the contacted portion 76b has moved to a position largely disengaged from the first valley portion 71a corresponding to the parking position due to the stop of the control of the motor 20 and the stop of the supply of the drive current to the motor 20.

In the present example embodiment, the first predetermined time is longer than the second predetermined time.

As a result, it is possible to more accurately determine that the contacted portion 76b is stationary in the first valley portion 71a corresponding to the parking position among the plurality of valley portions provided in the detent plate 71 based on the motor rotation angle φ detected by the first rotation sensor 51.

In the present example embodiment, the target rotation angle φt is a value obtained by subtracting a predetermined value φp of the rotation angle (motor rotation angle φ) from the P-side wall 71d to the first valley portion 71a from the side wall position angle φw.

As a result, it is possible to more accurately determine that the contacted portion 76b is stationary in the first valley portion 71a corresponding to the parking position among the plurality of valley portions provided in the detent plate 71 based on the motor rotation angle φ detected by the first rotation sensor 51.

The present disclosure is not limited to the above example embodiments, and the configurations described in the present description can be appropriately combined within a range not conflicting with one another.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric actuator to switch a shift position, the electric actuator comprising:
   a motor;
   an output shaft to be driven by the motor;
   a detent plate fixed to the output shaft and including valley portions including a first valley portion corresponding to a parking position provided on one end side in a circumferential direction and a second valley portion corresponding to a non-parking position provided on another end side in the circumferential direction;
   an elastic portion including a contacted portion to be brought into contact with any one of the valley portions by an elastic force generated by rotation of the detent plate;
   a first rotation sensor to detect a first rotation angle that is a rotation angle of the motor;
   a second rotation sensor to detect a second rotation angle that is a rotation angle of the output shaft; and
   a controller to control the motor based on detection results of the first rotation angle and the second rotation angle;
   wherein
   when an abnormality occurs in the second rotation sensor, the controller is configured or programmed to execute:
      abutting the contacted portion on a first side wall portion located on one end side in the circumferential direction of the first valley portion in the detent plate by rotating the motor;
      acquiring, as a side wall position angle, the first rotation angle detected by the first rotation sensor when the contacted portion abuts on the first side wall portion;

a reverse rotation process of reversely rotating the motor to an angle at which the first rotation angle corresponds to a target rotation angle with reference to the side wall position angle; and a stationary determination process of determining that the contacted portion is stationary at the parking position when the first rotation angle detected by the first rotation sensor continues to fall within a first tolerance having the target rotation angle as a reference value within a first predetermined time.

2. The electric actuator according to claim 1, wherein after executing the reverse rotation process, the controller is configured or programmed to execute:

stopping control of the motor when the first rotation angle detected by the first rotation sensor continues to fall within a second tolerance having the target rotation angle as a reference value within a second predetermined time; and the stationary determination process after stopping the control of the motor.

3. The electric actuator according to claim 2, wherein the first tolerance is larger than the second tolerance.

4. The electric actuator according to claim 3, wherein the first predetermined time is longer than the second predetermined time.

5. The electric actuator according to claim 4, wherein the target rotation angle is a value obtained by subtracting a predetermined value of a rotation angle from the first side wall portion to the first valley portion from the side wall position angle.

6. The electric actuator according to claim 2, wherein the first predetermined time is longer than the second predetermined time.

7. The electric actuator according to claim 2, wherein the target rotation angle is a value obtained by subtracting a predetermined value of a rotation angle from the first side wall portion to the first valley portion from the side wall position angle.

8. The electric actuator according to claim 1, wherein the target rotation angle is a value obtained by subtracting a predetermined value of a rotation angle from the first side wall portion to the first valley portion from the side wall position angle.

* * * * *